UNITED STATES PATENT OFFICE.

CLAYTON W. BEDFORD, OF AKRON, OHIO, ASSIGNOR TO THE GOODYEAR TIRE & RUBBER CO., OF AKRON, OHIO, A CORPORATION OF OHIO.

ART OF VULCANIZING OR CURING CAOUTCHOUC SUBSTANCES.

1,371,664.  Specification of Letters Patent.  Patented Mar. 15, 1921.

No Drawing.  Application filed May 17, 1919. Serial No. 297,920.

*To all whom it may concern:*

Be it known that I, CLAYTON W. BEDFORD, a citizen of the United States, residing at Akron, in the county of Summit and State of Ohio, have invented a new and useful Improvement in Art of Vulcanizing or Curing Caoutchouc Substances, of which the following is a specification.

This invention relates to the art of vulcanizing or curing caoutchouc substances and to the products resulting therefrom, and is fully set forth in the following specification.

In my prior application No. 140,888 filed Jan. 6, 1917, I have set forth a process of vulcanizing caoutchouc substances wherein nitrogen containing bodies known as "accelerators" are employed, in accordance with which process the use of said nitrogen accelerators is facilitated and the results of their use in vulcanization processes improved by initially causing a reaction of the nitrogen accelerators employed with part or all of the sulfur of the rubber mix prior to incorporation into said mix to be vulcanized. In accordance therewith it is possible to carry out the reaction between the nitrogen accelerator and the sulfur at the temperature best suited thereto, to remove undesired gaseous or other by-products formed as a result of said reaction and in many cases to employ nitrogen accelerators which would otherwise be impractical or of no commercial value. The sulfur reaction product thus obtained, which is designated hereinafter as a sulfur-nitrogen accelerator, has in many cases a higher curing value than the nitrogen accelerator from which it is derived and frequently improves the quality of the product obtained on vulcanization.

In the present embodiment of my invention the nitrogenous compounds utilized are preferably of the type which may be characterized as Schiff's bases, which may be defined in general terms as the condensation products of aldehydes and primary amins. As a limiting example of such compounds I intend also to include hexamethylenetetramin, which may be regarded as a condensation product of formaldehyde and ammonia. It has furthermore been found that those of the said bases containing the methylene group are productive of particularly advantageous results in the process of the present invention.

As will be more fully hereinafter set forth, in the initial stage of the process wherein the nitrogen accelerator is reacted upon directly by sulfur, all of the sulfur required for the vulcanization process may be utilized or only a portion thereof. In general it is preferred that the relative proportions of the nitrogenous compounds and of the sulfur be such as to cause the sulfur to react completely with the nitrogenous compounds. Furthermore the reaction may take place in the presence of a solvent diluent, such as the aromatic amin, anilin, said solvents in some instances also modifying the character of the resulting product as well as the course of the reaction.

As an illustration of the process of the present invention, the methylene-containing Schiff's base, methylene-diphenyldiamin, $(C_6H_5.NH)_2.CH_2$, may be caused to react with sulfur in the following proportions by weight:

198 parts methylene-diphenyldiamin.
64 parts sulfur.

These ingredients are slowly melted and then heated to 120–150° C., until approximately 34 parts by weight of gas (corresponding to approximately 1 mol. of $H_2S$) are eliminated. The reaction product is then steam distilled, about 93 parts (1 mol.) of anilin which has been produced during the reaction being thereby removed.

The product is a somewhat brittle reddish brown to yellowish brown amorphous mass having a conchoidal fracture and with a softening point so low that it may be compounded in the rubber mix without grinding.

In forming a rubber mix with the sulfur nitrogen accelerator thus produced, whereby the curing powers thereof may be illustrated, 16 parts of zinc oxid, 16 parts of plantation pale-crape rubber, one part of sulfur and 0.90 parts of the sulfur nitrogen accelerator above described may be mixed by the ordinary methods in rubber compounding. Such a mix will vulcanize in from fifteen to twenty minutes, whereas with a nitrogen accelerator not previously treated with sulfur and used in larger amounts (from 1.00 to 1.25 parts in the same mix) a curing period of approximately forty five minutes is required. Furthermore the rubber produced by the use of the methylene-diphenyldiamin-sulfur accelerator is of somewhat higher tensile strength and greater expansibility than the rubber produced with the nitrogen accelerator untreated by sulfur.

As a further illustration of the initial reaction with sulfur the reaction between methylene-anilin (anhydro-formaldehyde-anilin) and sulfur may be utilized. The compound indicated by the term methylene-anilin is the product of reaction between formaldehyde and anilin in equimolecular proportions, and is a polymerized compound which may conveniently be considered as a di-polymer:

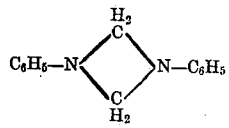

This product and sulfur may be caused to react in the following proportions:

210 parts (1 molecule of di-polymer) methylene-anilin.

64 parts sulfur.

These ingredients are slowly melted together and then heated to 150 to 170° C. until 34 to 36 parts of gas are removed. This gas consists principally of $H_2S$. Some $CS_2$ is also produced and eliminated in the course of the reaction. The product is then steam distilled until no more anilin passes over, the entire amount of anilin produced during reaction being thus driven off. After removal of the anilin the product is an amorphous dark reddish brown solid having resinous properties. It is brittle and may be ground; its softening point is, however, sufficiently low that grinding is not necessary for rubber compounding. The sulfur nitrogen accelerator thus produced may be incorporated into a mix of substantially the character of that previously described, likewise decreasing the length of time of cure and improving the tensile and elastic qualities of the vulcanized product.

As a further illustration of the reaction of such bases with sulfur, hexamethlyenetetramin and sulfur may be caused to react in proportions (1 mol. of hexamethylenetetramin to at least 4 mols. of sulfur). This reaction results in an evolution of gas, and in the formation of yellow vapors which may be condensed as a reddish oil and a residual solid, yellowish brown in color and somewhat soft and sticky. The solid residue may be substituted in the example of the rubber mix previously given for the sulfur reaction product named.

As has been previously stated, the reaction between the nitrogen compounds and the sulfur may take place in the presence of a solvent diluent, which may in some instances take part in the reaction. Such a solvent or diluent may be utilized to control the rate and temperature of the reaction or may likewise be used to modify its course. The aromatic amins, and particularly anilin, have been found to be particularly useful and advantageous in forming the sulfur-nitrogen accelerators in the initial stage of the vulcanization process.

As an illustration of the use of a solvent diluent, and particularly anilin, I may utilize methylene-anilin, sulfur and anilin in the following proportions:

210 parts methylene-anilin.
128 parts sulfur.
372 parts anilin.

The methylene-anilin and anilin are boiled under a reflux condenser for five hours at a temperature of 195° to 198° C., (thermometer in the liquid). The mixture is then cooled to 150° C., at which point the sulfur is added. The temperature is now raised slowly to 175° C. and held until 56 to 60 parts by weight of gas, principally hydrogen sulfid, are lost. The free anilin is now distilled off, preferably by steam distillation, care being taken to remove the last of the anilin from the reaction mixture to such an extent that the product will cool to a hard, brittle mass.

On using 1.25 parts of the sulfur-nitrogen accelerator thus produced in a rubber mix containing 1 part of sulfur, 16 parts zinc oxid and 16 parts of plantation pale-crape rubber, the mix will cure in approximately fifteen to twenty minutes, whereas if the nitrogen accelerator methylene-anilin is used in the same mix, even to the extent of 1.50 parts, the time of cure is forty five to fifty minutes. In addition to shortening the time of cure, thereby increasing the output of a given equipment, the product wherein the sulfur-nitrogen accelerator is used has a higher tensile strength, a higher modulus of elasticity and its quality is otherwise improved.

Methylene diphenyldiamin may likewise be utilized in a reaction similar to the above, substituting for the methylene-anilin a molecular proportion of the methylene diphenyldiamin. Hexamethylenetetramin may also be substituted in the reaction with sulfur and anilin, as above described, the product resulting from its use having the characteristics of a mixture of the product resulting from the use of methylene-anilin and methylene diphenyldiamin in the presence of anilin together with, apparently, the product of reaction of hexamethylenetetramin with sulfur. The product of reaction of methylene diphenyldiamin or of hexamethylenetetramin with sulfur in the presence of anilin may be substituted in the rubber mix for the sulfur nitrogen accelerator in the example previously given.

The initial reaction between the nitrogen compounds and the sulfur may be effected either in the presence or in the absence of anilin or other solvent diluents, as is indicated by the above examples and illustrations given. Other solvent diluents than anilin may be used, for example, xylol, for the purpose of controlling the rate and temperature of reaction, but in general I prefer that a compound of the aromatic amin class, such as anilin, paratoluidin, or the like, be used.

It will be understood that I do not regard the present invention as limited by the specific examples which have been hereinbefore set forth or by such theoretical statements as may have been made, nor as dependent upon the soundness or accuracy of such theoretical statements.

I claim:

1. The process of effecting the curing of rubber which consists in bringing together under reacting conditions sulfur and a methylene group-containing Schiff base to form a sulfur-nitrogen accelerator, incorporating the sulfur-nitrogen accelerator in the caoutchouc mix and vulcanizing the same.

2. The process of effecting the curing of rubber which consists in bringing together under reacting conditions sulfur and methylene-anilin, to form a sulfur-nitrogen accelerator, incorporating the sulfur-nitrogen accelerator in the caoutchouc mix and vulcanizing the same.

3. The process of effecting the curing of rubber which consists in bringing together under reacting conditions sulfur and a methylene group-containing Schiff base in the presence of a solvent diluent to form a sulfur nitrogen accelerator, incorporating the sulfur-nitrogen accelerator in the caoutchouc mix and vulcanizing the same.

4. The process of effecting the curing of rubber which consists in bringing together under reacting conditions in the presence of an aromatic amin a methylene group-containing Schiff base and sulfur to form a sulfur-nitrogen accelerator, incorporating the sulfur-nitrogen accelerator in the caoutchouc and vulcanizing the same.

5. The process of effecting the curing of rubber which consists in bringing together under reacting conditions in the presence of anilin, sulfur and a methylene group-containing Schiff base to form a sulfur-nitrogen accelerator, incorporating the sulfur-nitrogen accelerator in the caoutchouc mix and vulcanizing the same.

6. The process of effecting the curing of rubber which consists in bringing together under reacting conditions in the presence of anilin, sulfur and methylene-anilin to form a sulfur-nitrogen accelerator, incorporating the sulfur-nitrogen accelerator in the caoutchouc mix and vulcanizing the same.

7. The vulcanized product formed by the reaction of caoutchouc, a vulcanizing agent and the product of reaction of sulfur on a methylene group-containing Schiff base.

8. The vulcanized product formed by the reaction of caoutchouc, a vulcanizing agent and the product of reaction of sulfur on a methylene group-containing Schiff base in the presence of anilin.

9. The vulcanized product formed by the reaction of caoutchouc, a vulcanizing agent and the product of reaction of sulfur on methylene-anilin in the presence of anilin.

10. The process of curing rubber which consists in incorporating into a rubber mixture a sulfur-nitrogen accelerator formed by bringing together under reacting conditions sulfur and a methylene group-containing Schiff's base, and heating the resultant mixture with a vulcanizing agent to effect vulcanization.

11. The process of curing rubber which consists in incorporating into a rubber mixture a sulfur-nitrogen accelerator formed by bringing together under reacting conditions sulfur and a methylene group-containing Schiff's base, in the presence of an aromatic amin, and heating the resultant mixture with a vulcanizing agent to effect vulcanization.

12. The process of curing rubber which consists in incorporating into a rubber mixture a sulfur-nitrogen accelerator formed by bringing together under reacting conditions sulfur and methylene-anilin, and heating the resultant mixture with a vulcanizing agent to effect vulcanization.

13. The process of curing rubber which consists in incorporating into a rubber mixture a sulfur-nitrogen accelerator formed by bringing together under reacting conditions sulfur and methylene-anilin in the presence of amin, and heating the resultant mixture with a vulcanizing agent to effect vulcanization.

CLAYTON W. BEDFORD.